US010328872B2

(12) United States Patent
Eldridge et al.

(10) Patent No.: US 10,328,872 B2
(45) Date of Patent: Jun. 25, 2019

(54) METHODOLOGY FOR SIMPLIFICATION OF AIRCRAFT HARNESSING IN MULTI-REDUNDANT CONTROL SYSTEMS (71) Applicant: Hamilton Sundstrand Corporation, Charlotte, NC (US)

(72) Inventors: Jeffrey A. Eldridge, Ellington, CT (US); Steven A. Avritch, Bristol, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 159 days.

(21) Appl. No.: 15/197,139

(22) Filed: Jun. 29, 2016

(65) Prior Publication Data
US 2018/0001844 A1   Jan. 4, 2018

(51) Int. Cl.
*B60R 16/00* (2006.01)
*B60R 16/02* (2006.01)
*B64D 43/00* (2006.01)
*H04L 12/40* (2006.01)
*H04L 12/46* (2006.01)

(52) U.S. Cl.
CPC .......... *B60R 16/0207* (2013.01); *B64D 43/00* (2013.01); *H04L 12/40006* (2013.01); *H04L 12/4625* (2013.01); *H04L 2012/4028* (2013.01)

(58) Field of Classification Search
CPC ................ B60R 16/0207; B60R 16/027
USPC .......................................................... 307/9.1
See application file for complete search history.

(56) References Cited

U.S. PATENT DOCUMENTS

| 4,101,958 | A  | * | 7/1978  | Patterson ............. G05D 1/0077 |
|           |    |   |         | 701/14 |
| 4,105,900 | A  |   | 8/1978  | Martin et al. |
| 5,386,363 | A  |   | 1/1995  | Haak et al. |
| 6,225,811 | B1 | * | 5/2001  | Bruning ............... G01R 31/021 |
|           |    |   |         | 324/541 |
| 7,263,630 | B2 | * | 8/2007  | Sailer ...................... G05B 9/03 |
|           |    |   |         | 700/79 |
| 7,505,400 | B2 |   | 3/2009  | Bibby et al. |
| 7,561,944 | B2 |   | 7/2009  | Yeh |
| 8,534,599 | B2 |   | 9/2013  | Noll et al. |
| 2004/0195460 | A1 | * | 10/2004 | Sailer ...................... G05B 9/03 |
|           |    |   |         | 244/194 |
| 2007/0230330 | A1 |   | 10/2007 | Dietz et al. |
| 2008/0205416 | A1 |   | 8/2008  | Dechiara |
| 2010/0280725 | A1 | * | 11/2010 | Cahill ................... B60T 8/1703 |
|           |    |   |         | 701/70 |

(Continued)

OTHER PUBLICATIONS

Search Report dated Oct. 9, 2017 in EP Application No. EP17178825, 8 pages.

*Primary Examiner* — Adi Amrany
(74) *Attorney, Agent, or Firm* — Cantor Colburn LLP (57) ABSTRACT

A method and control system that implements a particular aircraft harnessing for an aircraft is provided. The control system includes an effector Line-Replaceable Unit (LRU) including a first connection port, a second connection port, and a first interconnect wire internally connecting the first connection port and the second connection port, a first control LRU connected using a first harnessing to the effector LRU, and a second control LRU connected using a second harnessing to the effector LRU, wherein the first control LRU and the second control LRU are configured to communicate using the first interconnect wire in the effector LRU.

19 Claims, 4 Drawing Sheets

(56) References Cited

U.S. PATENT DOCUMENTS

2015/0207858 A1\* 7/2015 de Bes .................... H04L 67/10
                                                              709/218
2016/0028835 A1\* 1/2016 Morikawa ......... H04L 12/40189
                                                              714/807
2016/0134899 A1   5/2016 Petrisor et al.

\* cited by examiner

FIG. 1
Related Art

METHODOLOGY FOR SIMPLIFICATION OF AIRCRAFT HARNESSING IN MULTI-REDUNDANT CONTROL SYSTEMS

BACKGROUND

The subject matter disclosed herein generally relates to aircraft harnessing and, more particularly, to aircraft harnessing in multi-redundant control systems.

In one or more aircrafts, multiple wiring harnesses are included to connect different components that can provide power and/or signal transfer capabilities for controlling and/or transferring data between the components. Further, in multi-redundant control systems that consist of multiple Line-Replaceable Units (LRU) that instantiate the redundant lanes of control, there are typically a variety of signals that must be routed to/from each redundant lane to all other redundant lanes. The crisscrossing of these inter-channel signals significantly increases the complexity of the aircraft harnessing and makes shielding of the cables bundles very difficult due to the harness bifurcations that are required to route wires.

Accordingly, there is a need to provide a system and method for improving the wire harnessing in an aircraft.

BRIEF DESCRIPTION

According to one embodiment, a control system with aircraft harnessing for an aircraft is provided. The control system includes an effector Line-Replaceable Unit (LRU) including a first connection port, a second connection port, and a first interconnect wire internally connecting the first connection port and the second connection port, a first control LRU connected using a first harnessing to the effector LRU, and a second control LRU connected using a second harnessing to the effector LRU, wherein the first control LRU and the second control LRU are configured to communicate using the first interconnect wire in the effector LRU.

In addition to one or more of the features described above, or as an alternative, further embodiments may include a third control LRU connecting using a third harnessing to the effector LRU, wherein the effector LRU further includes a third connection port, a second interconnect wire internally connecting the first connection port and the third connection port, and a third interconnect wire internally connecting the second connection port and the third connection port, wherein the first control LRU, the second control LRU, and the third control LRU are configured to communicate with each other using the first interconnect wire, the second interconnect wire, and the third interconnect wire in the effector LRU.

In addition to one or more of the features described above, or as an alternative, further embodiments may include, wherein the first harnessing includes a communication cable configured to transmit data signals between the first control LRU and the effector LRU.

In addition to one or more of the features described above, or as an alternative, further embodiments may include, wherein the communication cable includes a first receive wire and a first transmit wire that are configured to receive and transmit data signals with the second control LRU.

In addition to one or more of the features described above, or as an alternative, further embodiments may include, wherein the first harnessing includes a communication cable that includes a first receive wire and a first transmit wire that are configured to receive and transmit data signals with the second control LRU, and a second receive wire and a second transmit wire that are configured to receive and transmit data signals with the third control LRU.

In addition to one or more of the features described above, or as an alternative, further embodiments may include, wherein the first harnessing further includes a motor drive wire that provides electric power, a linear variable differential transformer (LVDT) wire that transmits signals that are configured to provide position information, and a resistance temperature detector (RTD) wire that transmits a signal that is configured to provide temperature information.

In addition to one or more of the features described above, or as an alternative, further embodiments may include, wherein the effector LRU is an actuator.

In addition to one or more of the features described above, or as an alternative, further embodiments may include, wherein the first control LRU and the second control LRU are redundant controllers configured to control the effector LRU.

In addition to one or more of the features described above, or as an alternative, further embodiments may include, wherein the first control LRU is a flight control computer.

In addition to one or more of the features described above, or as an alternative, further embodiments may include, wherein the third control LRU is a redundant controller configured to control the effector LRU along with the first control LRU and the second control LRU.

In addition to one or more of the features described above, or as an alternative, further embodiments may include a plurality of control LRUs that are each connected to each other using a plurality of interconnect wires disposed within the effector LRU.

According to another embodiment, an effector Line-Replaceable Unit (LRU) is provided. The LRU includes a first connection port configured to connect to a first control LRU using a first harnessing that includes a first communication cable, a second connection port configured to connect to a second control LRU using a second harnessing that includes a second communication cable, a third connection port configured to connect to a third control LRU using a third harnessing that includes a third communication cable, a first interconnect wire internally connecting the first connection port and the second connection port, a second interconnect wire internally connecting the first connection port and the third connection port, and a third interconnect wire internally connecting the second connection port and the third connection port, wherein the first control LRU, the second control LRU, and the third control LRU are configured to communicate with each other using the first interconnect wire, the second interconnect wire, and the third interconnect wire in the effector LRU.

In addition to one or more of the features described above, or as an alternative, further embodiments may include, wherein the first communication cable includes a first receive wire and a first transmit wire that are configured to receive and transmit data signals with the second control LRU, and a second receive wire and a second transmit wire that are configured to receive and transmit data signals with the third control LRU.

In addition to one or more of the features described above, or as an alternative, further embodiments may include, wherein the first harnessing further includes a motor drive wire that provides electric power, a linear variable differential transformer (LVDT) wire that transmits signals that are configured to provide position information, and a resistance temperature detector (RTD) wire that transmits a signal that is configured to provide temperature information.

In addition to one or more of the features described above, or as an alternative, further embodiments may include, wherein the effector LRU is an actuator.

In addition to one or more of the features described above, or as an alternative, further embodiments may include, wherein the first control LRU, the second control LRU, and the third control LRU are redundant controllers configured to control the effector LRU.

In addition to one or more of the features described above, or as an alternative, further embodiments may include, wherein the first control LRU is a flight control computer.

According to another embodiment, a method of implementing a control system for controlling an aircraft is provided. The method includes providing an effector Line-Replaceable Unit (LRU), connecting a first connection port of the effector LRU to a second connection port of the LRU internally using a first interconnect wire, connecting the first connection port to a third connection port of the LRU internally using a second interconnect wire, connecting the second connection port and the third connection port using a third interconnect wire, providing a first control LRU, a second control LRU, and a third control LRU that are connected to the first connection port, the second connection port, and the third connection port respectively, transmitting signals between the first control LRU, the second control LRU, and the third control LRU using the first interconnect wire, the second interconnect wire, and the third interconnect wire.

In addition to one or more of the features described above, or as an alternative, further embodiments may include, wherein the effector LRU is an actuator.

In addition to one or more of the features described above, or as an alternative, further embodiments may include, wherein the first control LRU, the second control LRU, and the third control LRU are redundant controllers configured to control the effector LRU.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

One or more embodiments are directed toward aircraft harnessing in a multi-redundant control system. One or more embodiments as disclosed are applicable to a multi-redundant control system with any multiple of LRUs requiring interconnecting signals. Particularly, providing harnessing within an effector Line-Replaceable Units (LRU) that connects a plurality of control LRUs. The effector LRU can be an actuator and the control LRUs can be, for example, digital controllers, electronics of an actuator, an actuated control unit, a linear electric motor configured to control the actuator and aircraft hydraulics.

In accordance with one or more embodiments as disclosed herein, the control system can facilitate a simplified aircraft harness scheme by crisscrossing the inter-lane signals in a remote LRU instead of within the harnessing itself. For example, in an aircraft installation where there are three independent control LRUs (such as the flight control computers) and a single effector LRU (such as an actuator), crisscrossing of the inter-lane signaling within the actuator dramatically simplifies the aircraft harnesses that are run through the aircraft. Also, one or more embodiments as disclosed herein may also reduce the quantity of uniquely keyed connectors by making the LRU Lane IDs independent of the wire harness connections.

Figure 1:
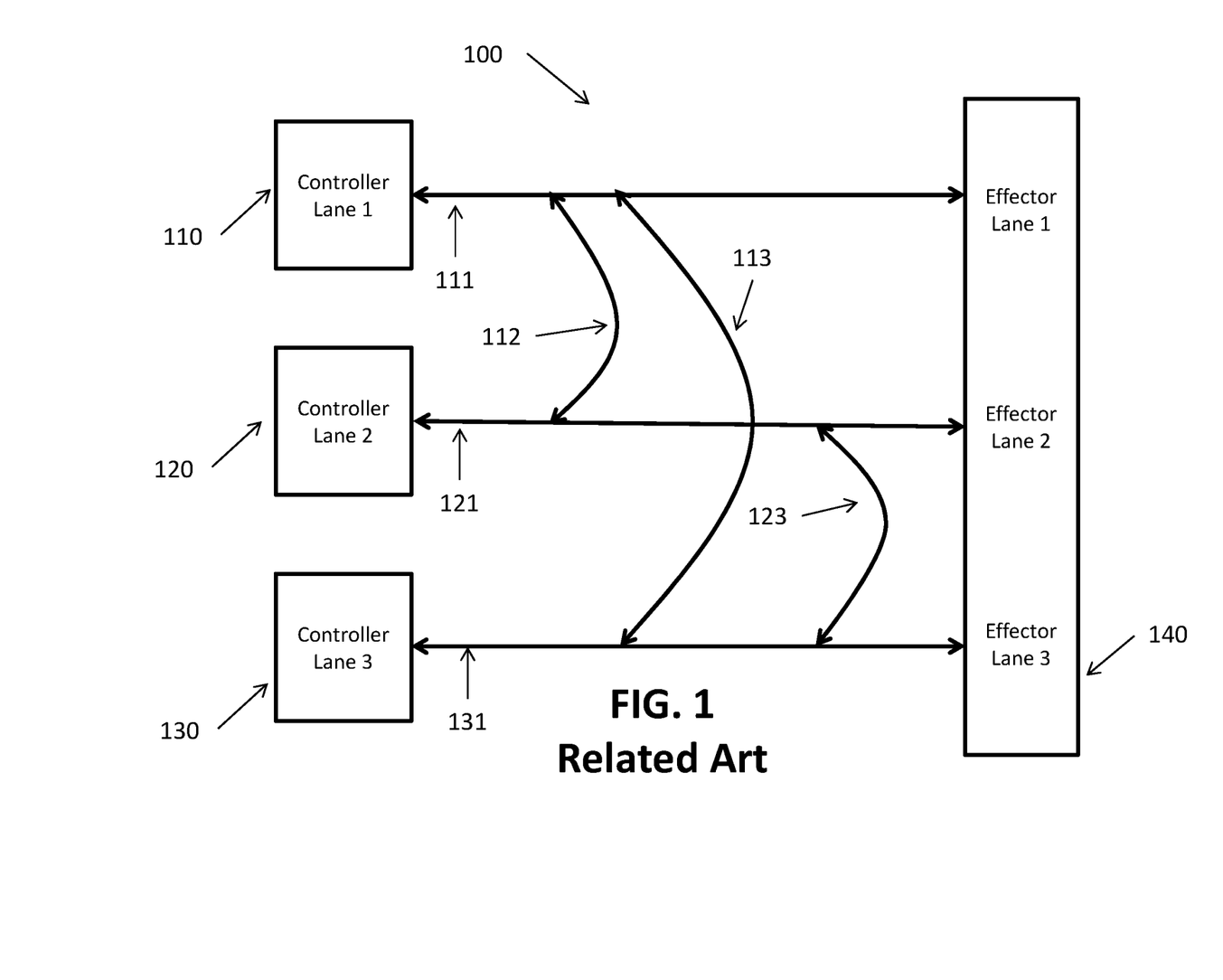
FIG. 1 depicts aircraft harnessing in a multi-redundant control system.

Turning now to the figures, FIG. 1 depicts aircraft harnessing in a multi-redundant control system 100. As shown, previous systems include providing an "octopus" style harnessing whereby each control LRU 110, 120, and 130 are each connected to each other as well as the effector LRU 140 by independent harnessing 111, 121, 131,112, 113, and 123. Specifically, the first control LRU 110 is connected to the effector LRU 140 using a first harnessing 111. The first control LRU 110 is also connected to the second control LRU 120 through a second harnessing 112. The first control LRU 110 is further connected to the third control LRU 130 using a third harnessing 113. The second control LRU 120 is connected to the effector LRU 140 using a fourth harnessing 121 and is connected to the third control LRU 130 using a fifth harnessing 123. The third control LRU 130 is connected to the effector LRU 140 using a sixth harnessing 131. Thus, for each control LRU a number of harnessing are needed to independently connect to all of the other devices in the system some of which can be located at a different end of the aircraft thereby requiring not only a plurality but also long harnesses to connect all the elements.

Figure 2:
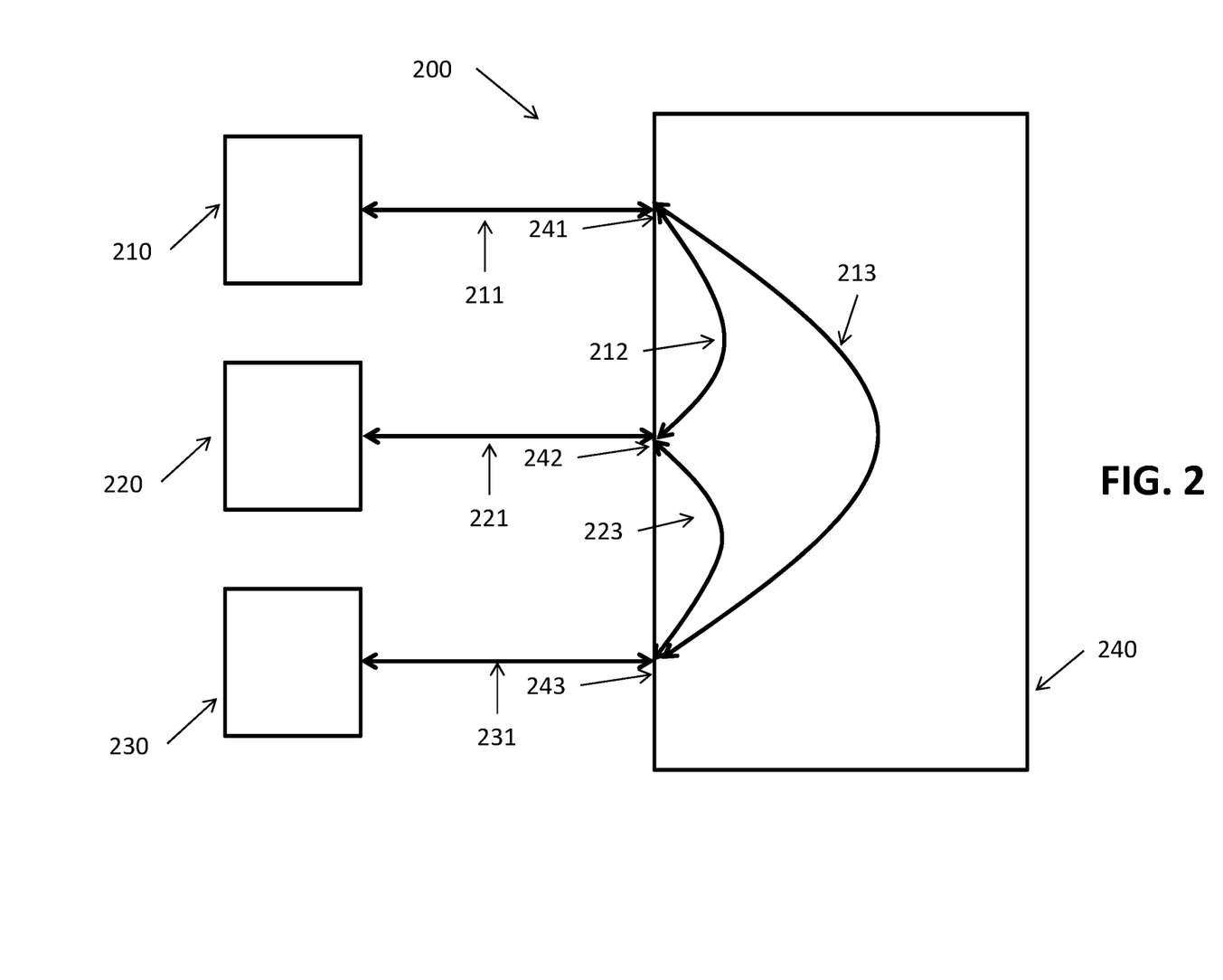
FIG. 2 depicts aircraft harnessing in a multi-redundant control system in accordance with one or more embodiments of the present disclosure.

FIG. 2 depicts aircraft harnessing in a multi-redundant control system 200 in accordance with one or more embodiments of the present disclosure. As shown the multi-redundant control system 200 includes a plurality of control LRUs 210, 220, and 230. The control LRUs 210, 220, and 230 can be redundant controllers for controlling an effector LRU 240. For example the control LRUs 210, 220, and 230 can be a flight control computer or other control circuitry that controls the LRU 240. The effector LRU 240 can be an actuator. For example, the effector LRU 240 can be an actuator that is configured to drive one or more hydraulics in the aircraft.

The effector LRU 240 includes internal harnessing 212, 213, and 223 that provides connections between every connection port provided on the effector LRU 240. The internal harnessing can also be referred to a first interconnect wire 212, a second interconnect wire 213, and a third interconnect wire 223. Specifically, as shown the effector LRU 240 has three connection ports 241, 242, and 243 where the three control LRUs 210, 220, and 230 respectively are connected to the effector LRU 240. The internal harnessing 212, also called the first interconnect wire 212, provides a connection between the first connection port 241 and the second connection port 242. The internal harnessing 223, also called the third interconnect wire 223, provides a connection between the second connection port 242 and the third connection port 243. The internal harnessing 213, also called the second interconnect wire 213, provides a connection between the first connection port 241 and the third connection port 243. Accordingly, the effector LRU 240, which may be an actuator, provides internal connections 212, 213, and 223 between all connection ports 241, 242, and 243. Accordingly, is another embodiment that includes more connection ports, additional internal harnessing is provided such that each connection port is directly connected to all other connection ports.

Accordingly, the multi-redundant control system 200 is able to provide a single harnessing for connection any of the control LRUs to the effector LRU 240. Specifically, as shown in FIG. 2, the first control LRU 210 is connected to the effector LRU 240 using a first harnessing 211, the second control LRU 220 is connected to the effector LRU 240 using a second harnessing 221, and the third control LRU 230 is connected to the effector LRU 240 using a third harnessing 231. Each of the control LRUs 210, 220, and 230 is still able to communicate with any of the other control LRUs through the internal harnessing provided within the effector LRU 240. For example, the first control LRU 210 is able to directly communicate with the second control LRU 220 by transmitting and receiving signals through harnessing 211, then through harnessing 212 and finally through harnessing 221. The communication path for the first control LRU 210 to communicate with the third control LRU 230 includes harnessing 211, 213, and 231.

Figure 3:
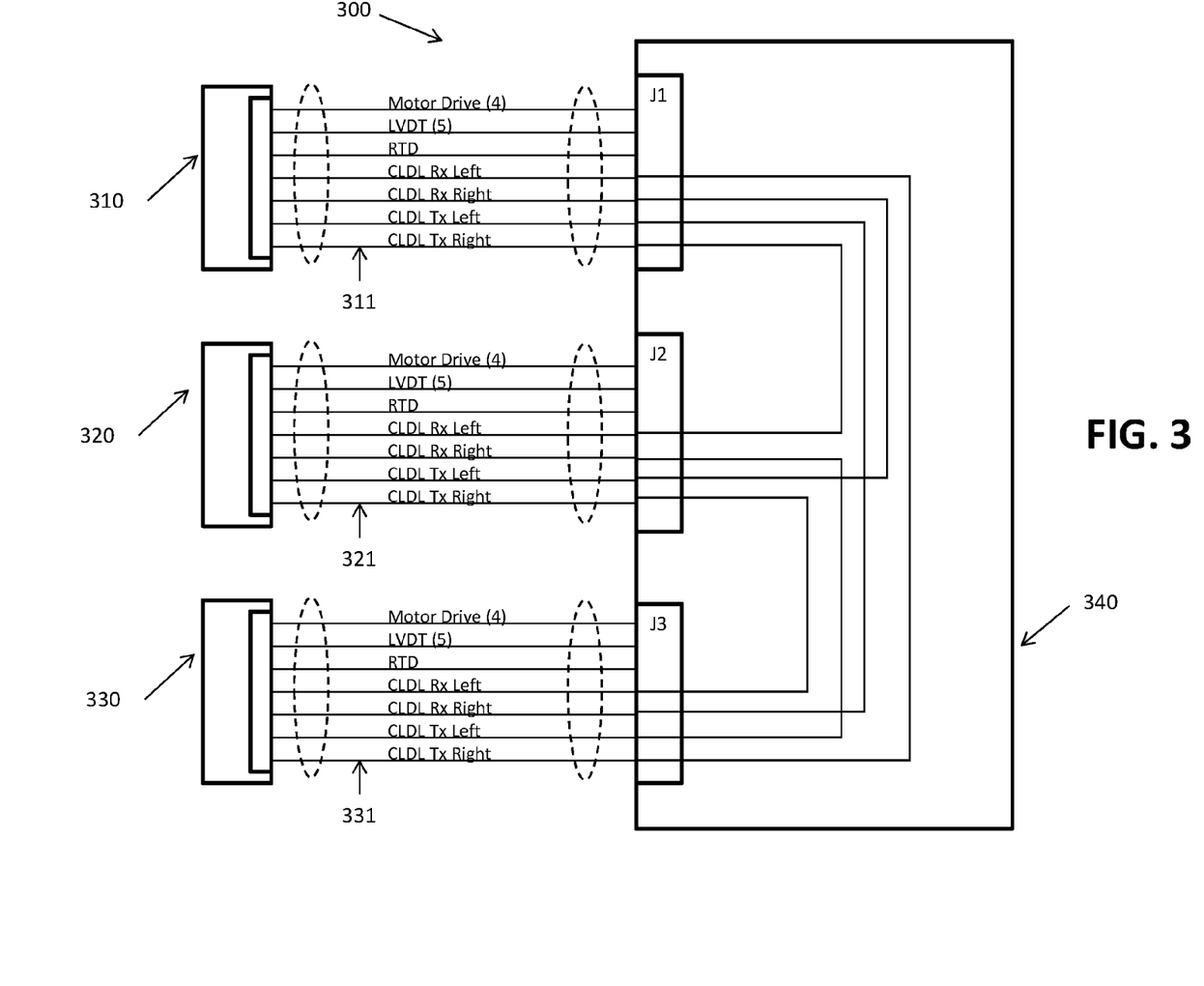
FIG. 3 depicts aircraft harnessing in a multi-redundant control system in accordance with one or more embodiments of the present disclosure.

FIG. 3 depicts aircraft harnessing in a multi-redundant control system 300 in accordance with one or more embodiments of the present disclosure. Specifically, FIG. 3 depicts an example showing the particular wires included as well as the wire arrangement within each harnessing portion in accordance with one or more embodiments. The multi-redundant control system 300 includes an effector LRU 340, which may be an actuator, a first control LRU 310, a second control LRU 320, and a third control LRU 330. The first control LRU 310 is connected using a collection of wires 311 as shown that make up the first harnessing 311. Similarly, the second LRU 320 and the third LRU 330 are connected with similar wire bundles 321 and 331 that make up the second harnessing 321 and the third harnessing 331. Further, the effector LRU 340, which may be an actuator, includes internal wiring that connected each communication wire to a corresponding point.

Specifically, FIG. 3 shows a first harnessing 311 that includes at least seven wires. A first wire (Motor Drive (4)) is a motor drive wire that provides electric power. The second wire (LVDT (5)) a linear variable differential transformer (LVDT) wire that transmits signals that are configured to provide position information. The third wire (RTD) is a resistance temperature detector (RTD) wire that transmits a signal that is configured to provide temperature information. The fourth wire (CLDL Rx Left—meaning Cross Lane Data Link Receive Left) is a wire configured to receive a data signal from another control LRU 330 that is wired to the "left" as well as a fifth wire (CLDL Tx Left—meaning Cross Lane Data Link Transmit Left) that is configured to transmit a data signal to the third control LRU 330. Further, a sixth and seventh wires (CLDL Rx Right and CLDL Tx Right) are provided that provided transmit and receive capabilities between the first control LRU 310 and the second control LRU 320 which is connected to the "right" of the first control LRU 310.

The "left" and "right" terminology is used as a relative indicator and does not indicate that the LRUs are physically arranged in such a manner. For example, according to one or more examples, the first control LRU 310 may be located above, in front of, behind, to the left, or could in-fact be placed to the right of the second control LRU 320. The second control LRU 320 and the third control LRU 330 are connected to the effector LRU 340 using identical harnessing that includes the seven wires as discussed above.

Accordingly, the effector LRU 340 includes the discussed internal wires that provides connection between each connected control LRU 310, 320, and 330 while allowing each of the connected control LRU 310, 320, and 330 to only use a single harnessing made up a number of wires for connection with the effector LRU 340 which then provides communication paths internally for each of the connected LRUs to be able to communicate with other connected LRUs.

Figure 4:
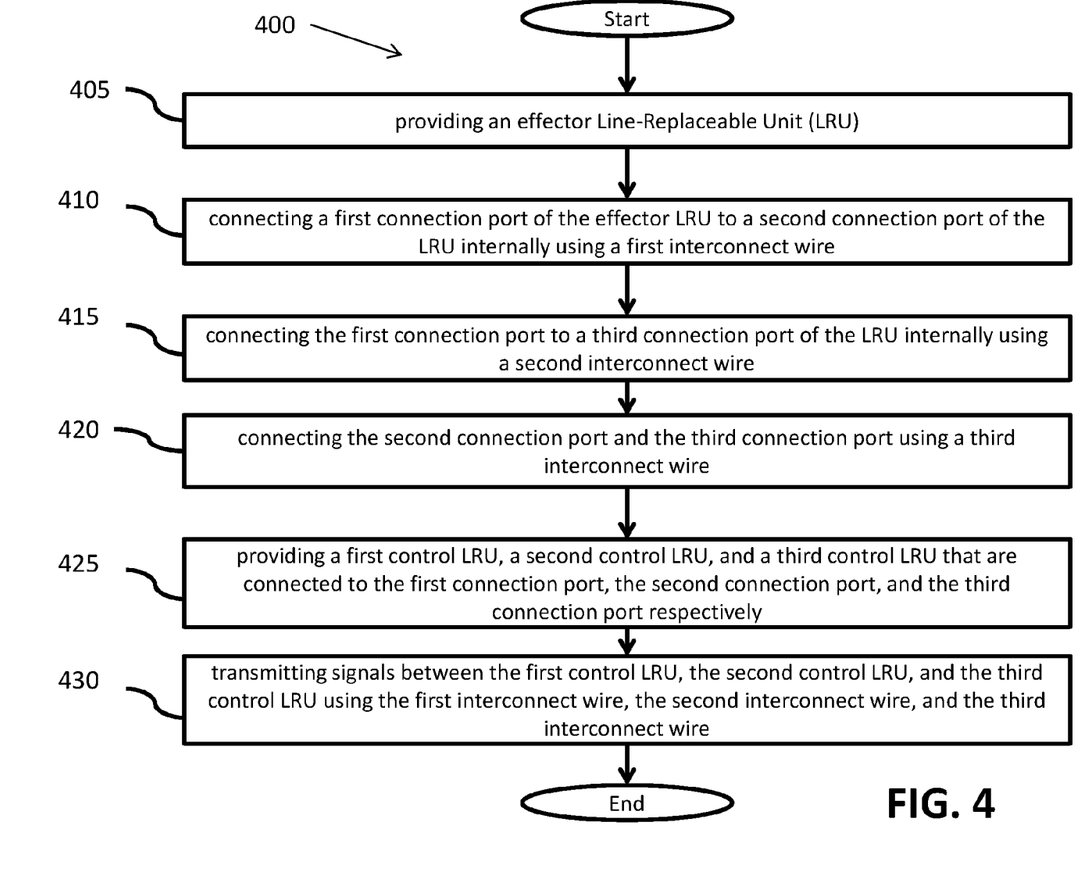
FIG. 4 a flowchart of a method of implementing aircraft harnessing in a multi-redundant control system in accordance with one or more embodiments of the present disclosure.

FIG. 4 a flowchart of a method 400 of implementing aircraft harnessing in a multi-redundant control system in accordance with one or more embodiments of the present disclosure. The method 400 includes providing an effector Line-Replaceable Unit (LRU) (operation 405).

The method 400 includes connecting a first connection port of the effector LRU to a second connection port of the LRU internally using a first interconnect wire (operation 410). The method 400 also includes connecting the first connection port to a third connection port of the LRU internally using a second interconnect wire (operation 415). Further, the method 400 includes connecting the second connection port and the third connection port using a third interconnect wire (operation 420). The method 400 includes providing a first control LRU, a second control LRU, and a third control LRU that are connected to the first connection port, the second connection port, and the third connection port respectively (operation 425). Also, the method 400 includes transmitting signals between the first control LRU, the second control LRU, and the third control LRU using the first interconnect wire, the second interconnect wire, and the third interconnect wire (operation 430).

According to one or more embodiments, a control system with aircraft harnessing for an aircraft is provided. The control system includes an effector Line-Replaceable Unit (LRU) including a first connection port J1, a second connection port J2, and a first interconnect wire internally connecting the first connection port J1 and the second connection port J2. The control system also includes a first control LRU connected using a first harnessing 311 to the effector LRU, and a second control LRU connected using a second harnessing 321 to the effector LRU. The first control LRU and the second control LRU are configured to communicate using the first interconnect wire in the effector LRU.

According to another embodiment, the system further includes a third control LRU 330 connecting using a third harnessing 331 to the effector LRU, wherein the effector LRU further includes a third connection port J3, a second interconnect wire internally connecting the first connection port J1 and the third connection port, and a third interconnect wire internally connecting the second connection port J2 and the third connection port J3. The first control LRU, the second control LRU, and the third control LRU are configured to communicate with each other using the first interconnect wire, the second interconnect wire, and the third interconnect wire in the effector LRU.

According to another embodiment, the first harnessing 311 includes a communication cable configured to transmit data signals between the first control LRU and the effector LRU. The communication cable includes a first receive wire CLDL Rx Right and a first transmit wire CLDL Tx Right that are configured to receive and transmit data signals with the second control LRU.

Further, according to another embodiment, the first harnessing 311 includes a communication cable that includes a first receive wire CLDL Rx Right and a first transmit wire CLDL Tx Right that are configured to receive and transmit data signals with the second control LRU, and a second receive wire CLDL Rx Left and a second transmit wire CLDL Rx Left that are configured to receive and transmit data signals with the third control LRU.

According to another embodiment the first harnessing can further include a motor drive wire (Motor Drive) that provides electric power, a linear variable differential transformer (LVDT) wire that transmits signals that are configured to provide position information, and a resistance temperature detector (RTD) wire that transmits a signal that is configured to provide temperature information. According to other embodiments, there can be any number of information sources in the Effector. Therefore, sources of data in the Effector can evolve from any type of sensor or information source such as, but not limited to, LVDT, RVDT, Resolver, Voltage Sensor, Current Sensor, Thermistor, pressure sensor, etc.

According to one or more embodiments, the effector LRU can be an actuator and/or the first control LRU and the second control LRU are redundant controllers configured to control the effector LRU. Further, according to an embodiment, the first control LRU is a flight control computer. Further, the third control LRU is a redundant controller configured to control the effector LRU along with the first control LRU and the second control LRU.

According to another embodiment, the control system further includes a plurality of control LRUs that are each connected to each other using a plurality of interconnect wires disposed within the effector LRU.

According to one or more embodiments, an effector Line-Replaceable Unit (LRU) can be provided. The effector LRU includes a first connection port configured to connect to a first control LRU using a first harnessing that includes a first communication cable, a second connection port configured to connect to a second control LRU using a second harnessing that includes a second communication cable, and a third connection port configured to connect to a third control LRU using a third harnessing that includes a third communication cable. The effector LRU further includes a first interconnect wire internally connecting the first connection port and the second connection port, a second interconnect wire internally connecting the first connection port and the third connection port, and a third interconnect wire internally connecting the second connection port and the third connection port. The first control LRU, the second control LRU, and the third control LRU are configured to communicate with each other using the first interconnect wire, the second interconnect wire, and the third interconnect wire in the effector LRU.

According to another embodiment, the first communication cable includes a first receive wire and a first transmit wire that are configured to receive and transmit data signals with the second control LRU, and a second receive wire and a second transmit wire that are configured to receive and transmit data signals with the third control LRU.

According to another embodiment, the first harnessing further includes a motor drive wire that provides electric power, a linear variable differential transformer (LVDT) wire that transmits signals that are configured to provide position information, and a resistance temperature detector (RTD) wire that transmits a signal that is configured to provide temperature information.

One or more embodiments as shown address a triplex redundancy were three control LRUs are provided and connected using internal wires in the effector LRU. According to other embodiments, additional levels of redundancy are also covered such as dual, triplex, quad, etc. Particularly, the design can scale by providing the effector LRU with additional connections ports and internal wiring that connects each port to the others allowing any number of control LRUs to connect by using a single harnessing while maintaining the ability to talk to all other control LRUs.

One or more embodiments as disclosed herein may help avoid the routing of inter-lane signals as traditionally performed in the aircraft harness itself helping avoid a complex "octopus" style harnesses. Further, one or more embodiments can help avoid including such harnessing that can be material intensive helping avoid concerns that include expense, weight, and difficulty shielding, and susceptibility to electromagnetic interference. Further, another advantage of one or more embodiments includes the ability relocate a controller LRU and one harness that connects to that LRU instead of the plurality of harnesses that would normally connect the controller LRU to all the other controller LRUs and effector LRU. Further, by having a single harnessing connecting each controller LRU to the effector LRU another benefit provided is a reduction in exposure to environmental damage susceptibility. Also, another embodiment includes flexibility in placement and reduced internal footprint providing more flexibility in placement to address ballistic concerns.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A control system with aircraft harnessing for an aircraft, the control system comprising:
    a single effector Line-Replaceable Unit (LRU) comprising:
        first, second and third connection ports;
        a first interconnect wire disposed internal to the effector LRU and internally connecting only the first connection port with only the second connection port;
        a second interconnect wire disposed internal to the effector LRU and internally connecting only the first connection port with only the third connection port; and
        a third interconnect wire disposed internal to the effector LRU and internally connecting only the second connection port with only the third connection port;
    a first control LRU connected using a first harnessing to the effector LRU;
    a second control LRU connected using a second harnessing to the effector LRU; and
    a third control LRU connected using a third harnessing to the effector LRU,
    wherein:
    the first control LRU and the second control LRU are configured to communicate using the first and second harnessing, respectively, and using only the first interconnect wire internal to the effector LRU,
    the first control LRU and the third control LRU are configured to communicate using the first and third harnessing, respectively, and using only the second interconnect wire internal to the effector LRU, and
    the second control LRU and the third control LRU are configured to communicate using the second and third harnessing, respectively, and using only the third interconnect wire internal to the effector LRU.

2. The control system of claim 1, wherein the first harnessing comprises:
    a communication cable configured to transmit data signals between the first control LRU and the effector LRU.

3. The control system of claim 2, wherein the communication cable comprises:
    a first receive wire and a first transmit wire that are configured to receive and transmit data signals with the second control LRU.

4. The control system of claim 1, wherein the first harnessing comprises:
    a communication cable that comprises:
        a first receive wire and a first transmit wire that are configured to receive and transmit data signals with the second control LRU; and
        a second receive wire and a second transmit wire that are configured to receive and transmit data signals with the third control LRU.

5. The control system of claim 4, wherein the first harnessing further comprises:
    a motor drive wire that provides electric power;
    a linear variable differential transformer (LVDT) wire that transmits signals that are configured to provide position information; and
    a resistance temperature detector (RTD) wire that transmits a signal that is configured to provide temperature information.

6. The control system of claim 1, wherein the effector LRU is an actuator.

7. The control system of claim 1, wherein the first control LRU and the second control LRU are redundant controllers configured to control the effector LRU.

8. The control system of claim 7, wherein the first control LRU is a flight control computer.

9. The control system of claim 1, wherein the third control LRU is a redundant controller configured to control the effector LRU along with the first control LRU and the second control LRU.

10. The control system of claim 1, further comprising a plurality of control LRUs that are each connected to each other using a plurality of interconnect wires disposed within the effector LRU.

11. A single effector Line-Replaceable Unit (LRU) for an aircraft comprising:
    a first connection port configured to connect to a first control LRU using a first harnessing that includes a first communication cable;
    a second connection port configured to connect to a second control LRU using a second harnessing that includes a second communication cable;
    a third connection port configured to connect to a third control LRU using a third harnessing that includes a third communication cable;
    a first interconnect wire disposed internal to the effector LRU and internally connecting only the first connection port with only the second connection port;
    a second interconnect wire disposed internal to the effector LRU and internally connecting only the first connection port with only the third connection port; and
    a third interconnect wire disposed internal to the effector LRU and internally connecting only the second connection port with only the third connection port,
    wherein:
    the first control LRU and the second control LRU are configured to communicate using the first and second harnessing, respectively, and using only the first interconnect wire internal to the effector LRU,
    the first control LRU and the third control LRU are configured to communicate using the first and third harnessing, respectively, and using only the second interconnect wire internal to the effector LRU, and
    the first second control LRU and the third control LRU are configured to communicate the using second and third harnessing, respectively, and using only the third interconnect wire internal to the effector LRU.

12. The effector LRU of claim 11, wherein the first communication cable comprises:
    a first receive wire and a first transmit wire that are configured to receive and transmit data signals with the second control LRU; and a second receive wire and a second transmit wire that are configured to receive and transmit data signals with the third control LRU.

13. The effector LRU of claim 11, wherein the first harnessing further comprises:
   a motor drive wire that provides electric power;
   a linear variable differential transformer (LVDT) wire that transmits signals that are configured to provide position information; and
   a resistance temperature detector (RTD) wire that transmits a signal that is configured to provide temperature information.

14. The effector LRU of claim 11, wherein the effector LRU is an actuator.

15. The effector LRU of claim 11, wherein the first control LRU, the second control LRU, and the third control LRU are redundant controllers configured to control the effector LRU.

16. The effector LRU of claim 15, wherein the first control LRU is a flight control computer.

17. A method of implementing a control system for controlling an aircraft, the method comprising:
   providing a single effector Line-Replaceable Unit (LRU) with first, second and third connection ports;
   connecting the first and second connection ports using only a first interconnect wire disposed internal to the effector LRU, the first and third connection ports using only a second interconnect wire disposed internal to the effector LRU and the second and third interconnect ports using only a third interconnect wire disposed internal to the effector LRU;
   providing a first control LRU, a second control LRU, and a third control LRU that are respectively connected to the first connection port, the second connection port and the third connection port by way of first, second and third harnessing, respectively;
   transmitting signals between the first control LRU and the second control LRU using the first and second harnessing, respectively, and using the first interconnect wire internal to the effector LRU;
   transmitting signals between the first control LRU and the third control LRU using the first and third harnessing, respectively, and using the second interconnect wire internal to the effector LRU; and
   transmitting signals between the second control LRU and the third control LRU using the second and third harnessing, respectively, and using the third interconnect wire internal to the effector LRU.

18. The method of claim 17, wherein the effector LRU is an actuator.

19. The method of claim 17, wherein the first control LRU, the second control LRU, and the third control LRU are redundant controllers configured to control the effector LRU.

* * * * *